Oct. 13, 1953  F. J. J. J. HENRARD  2,655,168
PULSATOR FOR MILKING MACHINES
Filed April 8, 1949  5 Sheets-Sheet 1
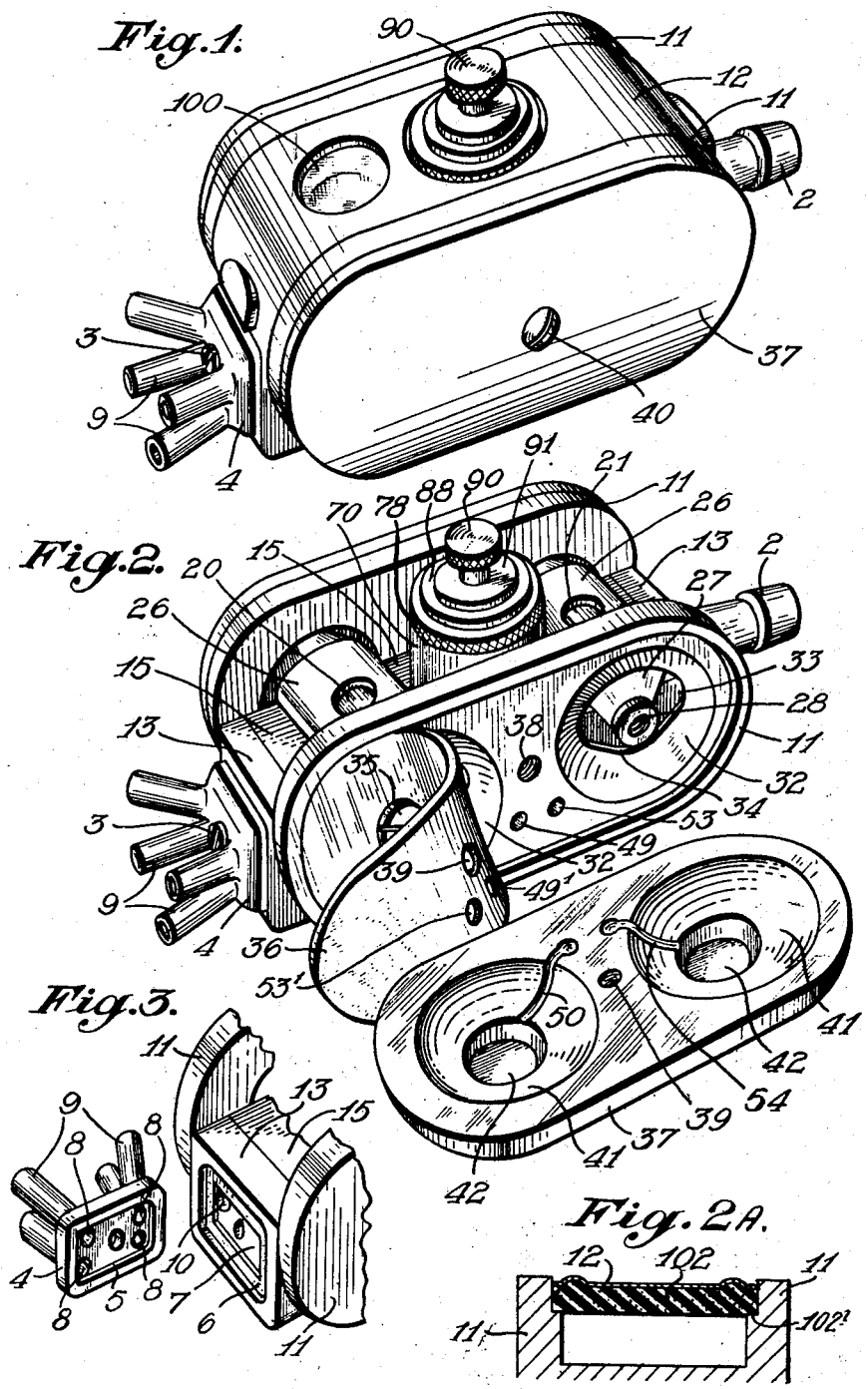
INVENTOR:
FERNAND JEAN JOSEPH JULIEN HENRARD
By
Richardson, David and Nordon
Attys

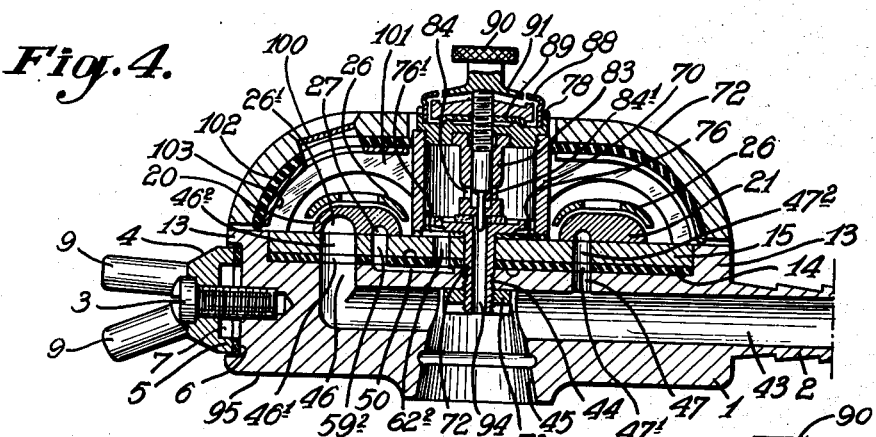
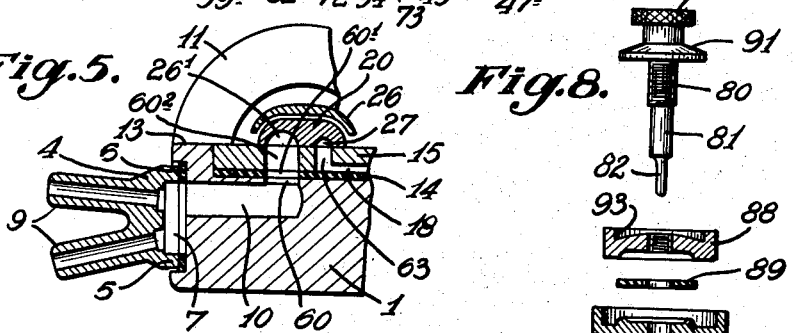
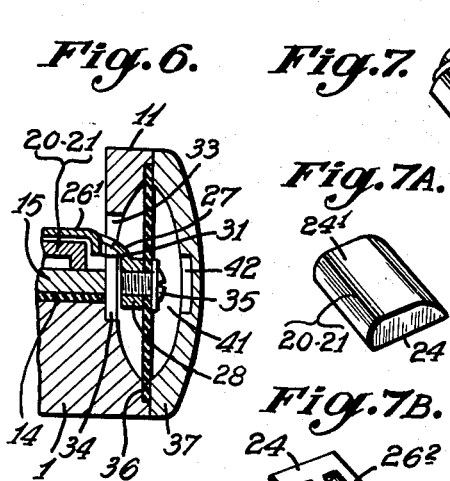
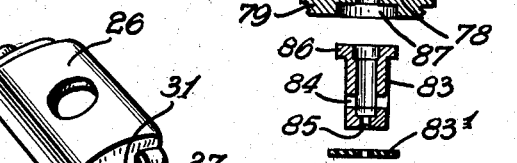
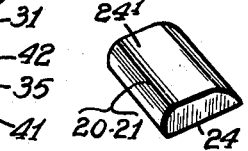
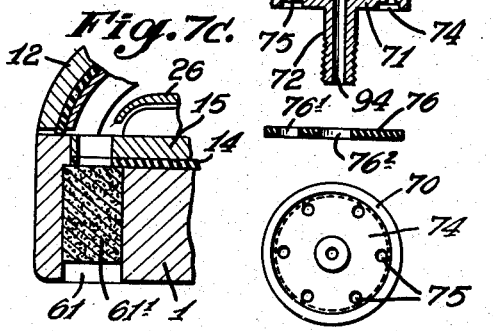
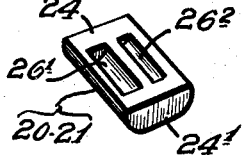

Oct. 13, 1953                F. J. J. HENRARD                2,655,168
PULSATOR FOR MILKING MACHINES
Filed April 8, 1949                                             5 Sheets-Sheet 3

INVENTOR:
FERNAND JEAN JOSEPH JULIEN HENRARD
BY
Richardson, David and Nordon
Attys

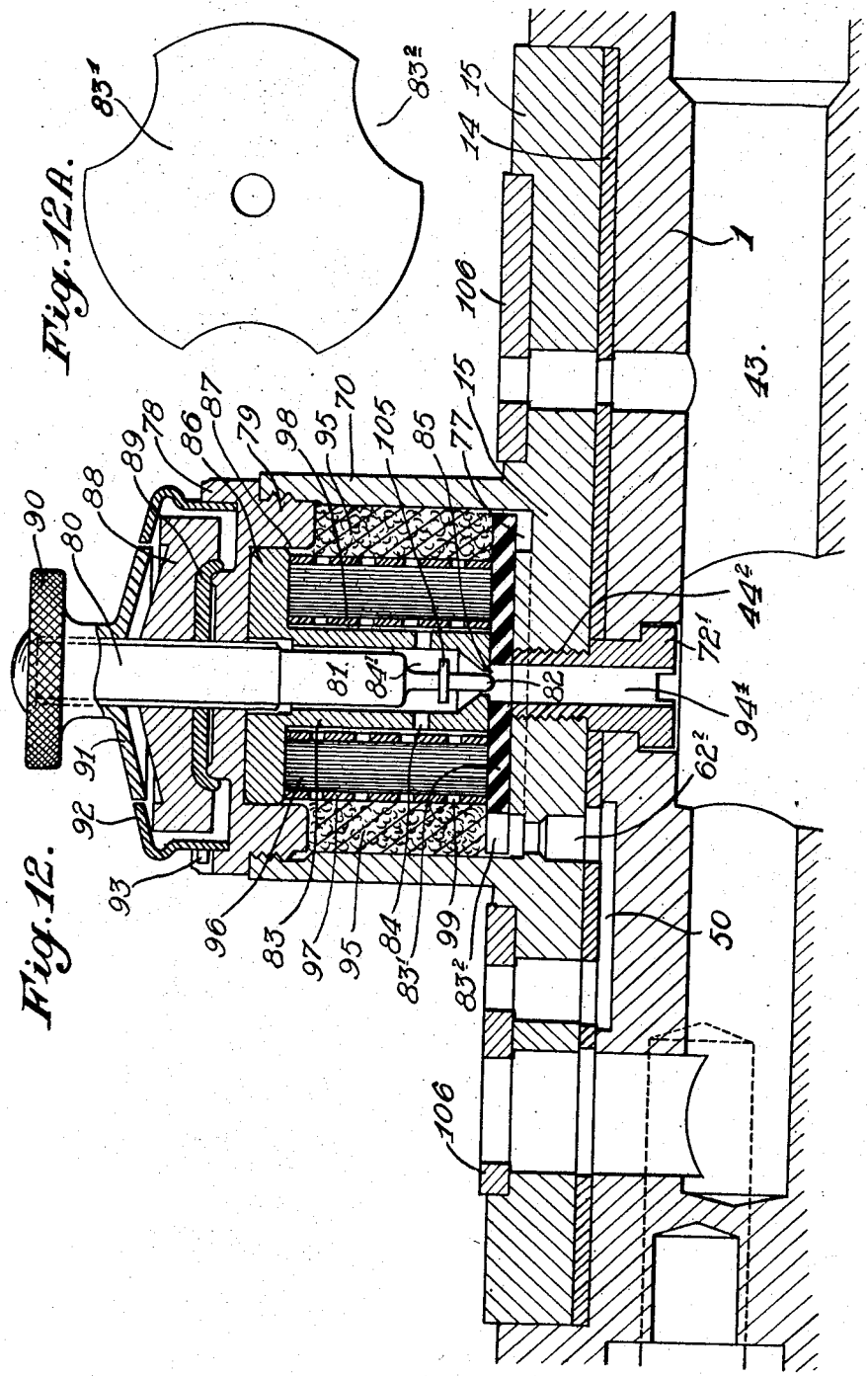

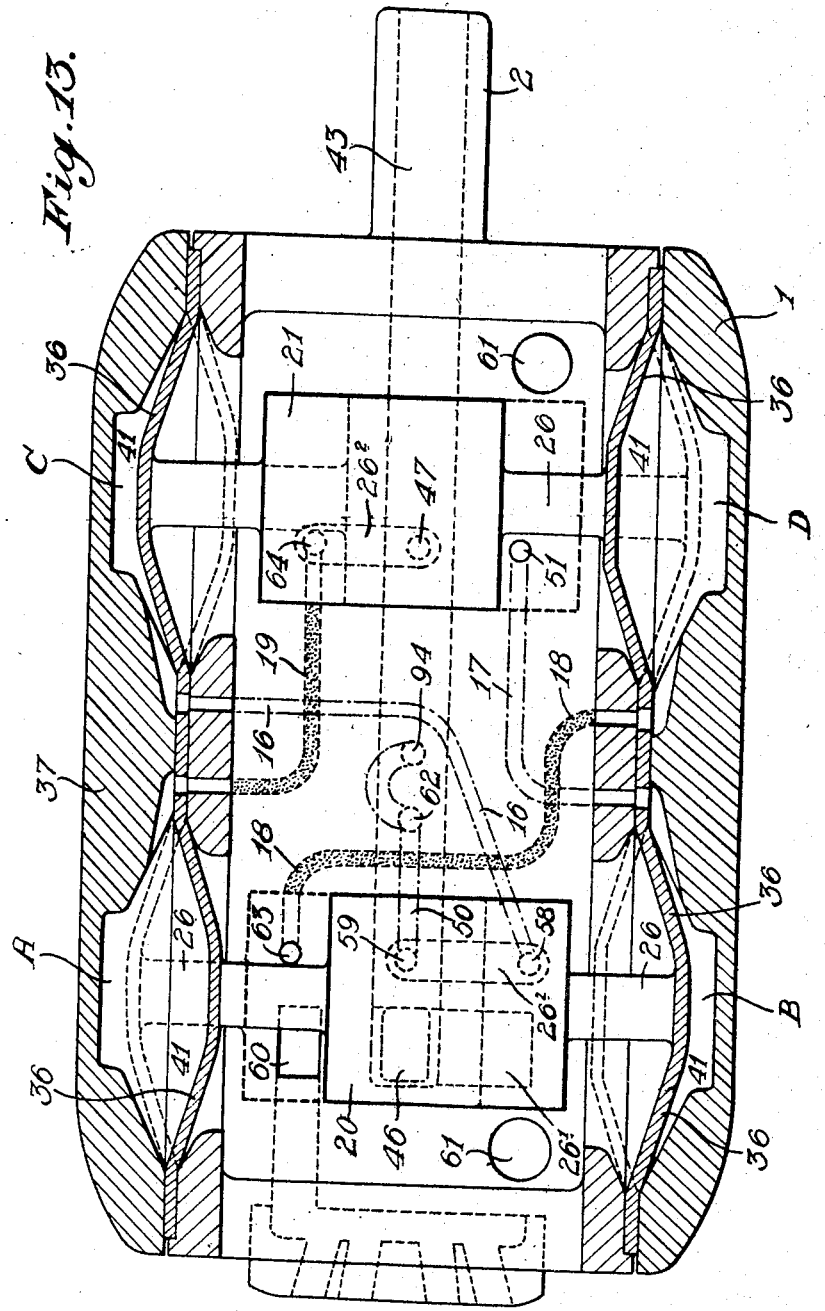

Patented Oct. 13, 1953

2,655,168

UNITED STATES PATENT OFFICE 2,655,168

PULSATOR FOR MILKING MACHINES

Fernand Jean Joseph Julien Henrard, Remicourt, Belgium, assignor to Ecremeuses Melotte, Societe Anonyme, Remicourt, Belgium, a Belgian company Application April 8, 1949, Serial No. 86,204
In France May 5, 1948

14 Claims. (Cl. 137—103)

My present invention relates to pulsators for milking machines and more particularly to this pulsator type that includes a supporting block provided with channels for the passage of atmospheric air and for the transmission of vacuum and also two sliding members assuming each a reciprocating movement in directions parallel to one another under the action of variations in pressure, one of said sliding members forming a control member while the other produces the alternating connection of the outer chambers of the flexible inflations with the suction means and with the outer atmosphere.

The invention is based on the fact that, in such apparatuses, various causes lead to a gradual slowing down of the frequency of the pulsations and that by reason of the misadjustment of the pulsators now on the market, the pulsations are sometimes too rapid and sometimes too slow but are rarely at the desired frequency.

The factors that may act on the operation and should be considered are as follows:

A. Lubrication

The lubrication of the moving members reduces the wear of the ported plates and of the slide valves and also that of the cylinders and pistons.

The reciprocation of the slide valves and the intermittent introduction of air into the pulsator leads the lubricant away from the point at which it is essential towards other points where it is detrimental.

Consequently, at each alternation, the lubricant to be found between the ported plate and the slide valve is sucked together with the dust forming a suspension in the cattle-shed air into the small sized openings and channels of the pulsator; consequently these openings and channels choke up and this produces objectionable congestions preventing the free circulation of air. On the other hand, the lubricant that is carried along forms deposits on the flexible inflations and in the rubber pipes that are thus damaged.

B. Dust

The dust forming a suspension in the air of the cattle-sheds is sucked into the pulsator, soils the ported plates and the slide valves, passes through the small internal channels and forms gradually for a part thereof a deposit round the port controlled by the needle-valve that adjusts the frequency of the pulsations. The free cross-sectional area of this port is thus progressively reduced which leads to a slowing down of the frequency of the pulsations.

The slow and inevitable agglomeration of dust round the needle valve is thus one of the causes determining the irregular working of the pulsator.

C. Moisture

The moisture of the air in the cattle-sheds condenses by cold weather on the metal parts of the pulsator, the parts that are the most exposed to such a condensation being the slide valves and the ported metal surfaces.

D. Gases

The gases contained in the air of the cattle-sheds have a corrosive action on the metal parts and add their objectionable influence to that of the water, whereby the ported plates and distributing slide valves are damaged.

E. Adjusting means

The poor design of the system of adjusting means for the frequency of pulsation has the highest responsibility as concerns the irregular working met with daily and this leads consequently to a faulty massage of the teats which is highly objectionable and prevents a proper practicable mechanical milking.

The present invention has for its object to remove the different drawbacks enumerated hereinabove, that are inherent to most of the pulsators used nowadays, whatever may be their design, and the invention affords an apparatus of a practicable design adapted to be manufactured on an industrial scale under excellent economical conditions by reason of the fact that it includes a minimum number of parts of simple shape that are capable, at least as concerns most of them, to be obtained with a material that may be cast through injection or under pressure in chill molds through modern casting methods whereby the subsequent machining operations required for finishing purposes are reduced to a minimum.

The invention has also for its object to make the dismantling and mounting of the pulsatory arrangement simple enough to allow any unskilled person to perform said operations; the invention aims more particularly at providing the pulsatory arrangement with adjusting means showing marks indicating the maximum and minimum frequency of pulsation so that the operator may adopt as desired the most suitable frequency in the arrangement thus designed.

One of the chief objects of the invention consists moreover in allowing, when required, the removal of the needle valve used for said adjustment without it being necessary to proceed with a further adjustment of the pulsatory arrangement when the needle valve has been returned into its operative position.

According to the invention, the improved pulsator is characterized chiefly by the fact that the supporting block is provided on its upper horizontal surface with grooves or channels and ports for the passage of atmospheric air or for the connection with vacuum, and that said upper horizontal surface of the supporting block carries two removable plate-shaped members lying in superposed relationship while the removable upper plate is also provided on its lower horizontal surface with grooves or channels and is furthermore perforated to form ports, the location of which corresponds generally with those of the ports in the supporting block; the removable intermediary plate that is merely provided with ports is flat and made preferably of a yielding compressible material, the superposition on the supporting blocks of the removable plates allowing the transformation into ducts of the grooves or channels formed on the upper horizontal surface of the supporting block and on the lower horizontal surface of the upper removable plate.

Further features of the invention will appear in the reading of the following description of a complete embodiment of such a pulsator. Said description is given hereinafter with reference to accompanying drawings, wherein:

Fig. 1 is a perspective view of the pulsator in its closed position.

Fig. 2 is also a perspective view of the open pulsatory arrangement showing the chief members forming same.

Fig. 2a is a sectional view of the plate and removable cover of the device.

Fig. 3 is a detail perspective view showing the means connecting up with the outer chambers of the nipples.

Fig. 4 is a vertical cross-sectional view through the longitudinal axis of the supporting block.

Fig. 5 is a detailed cross-sectional view showing the connection between the pipes leading to the outer chambers of the nipples and the milking slide valve.

Fig. 6 is a sectional view that is intended to show the means securing the pusher members of the slide valves to the diaphragms provided on the two opposite sides of the pulsatory arrangement.

Fig. 7 is a perspective view of one of the pusher members.

Figs. 7A and 7B are detail views of a slide valve in perspective view, said slide valve being that used for controlling or else for milking purposes.

Fig. 7C is a vertical cross sectional view that is intended to show a pipe for feeding atmospheric air into the chamber formed above the slide valve.

Fig. 8 is an exploded view adapted to show the different elements forming part of the means adjusting the number of pulsations.

Fig. 12 is a cross sectional view at an increased scale of the means for adjusting the number of pulsations and of the air filtering means, said arrangement being slightly modified with reference to that illustrated in Fig. 4.

Fig. 12A is a detail view.

Fig. 13 is a diagrammatic view illustrating the operation of the sliding members.

Figure 9:
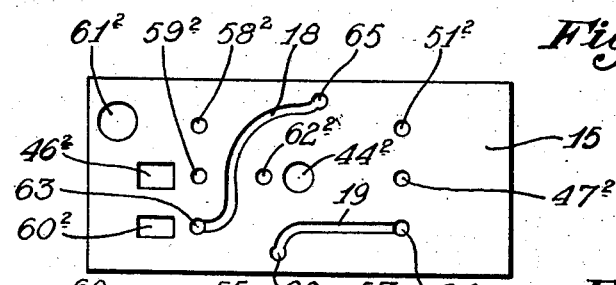
Fig. 9 is a detail view of the inner surface of the upper removable plate after turning over through 180° with reference to its operative position.

The pulsator includes as a body a supporting block 1 of rectangular cross-section and the height and width of which are substantially less than its length.

One of the outer surfaces of the block is rigid with a connection 2 adapted for the transmission of depression from a generator of vacuum while a plate 4 is removably secured, say through the agency of a screw 3 on its opposed extreme surface, said plate 4 being provided with a peripheral flange 5 urged against a packing 6 housed inside a slight depression of the block 1 so as to form a chamber 7 on the inside of the plate 4 into which chamber open at 8 (Fig. 3) the connecting tubes 9 rigid with the plate 4 and leading to the shells of the milking cups arranged at the outside of the flexible inflations or the like equivalent members so as to submit them alternatively to vacuum and to atmospheric pressure. This operation is obtained by means of a mechanism to be disclosed hereinafter and that acts through a bore 10 (Fig. 5) extending horizontally inside the block 1 over a certain length and opening into the chamber 7, in order to submit the latter alternatively to suction and to atmospheric pressure.

Each of the longer sides of the block 1 is rigid with a plate 11 arranged laterally and the height of which is substantially equal to twice that of the block 1 so as to produce above the latter and between the flanges formed thereby a chamber 101 filled with atmospheric air and closed by a removable cover 12 (Fig. 1).

On the other hand, the block is provided on its upper part along each of its small sides with a flange 13 and the space lying between the two opposite flanges serves for housing:

(1) A rectangular member 14 that may be formed by a sheet of a yielding and compressible material such as rubber. Said member 14 may however be made of any other material such as metal, a plastic material or the like.

(2) A rectangular plate 15 of metal or of rigid plastic material showing the same outer outline as the member 14 and superposed over the latter.

These plate members 14 and 15 are removable.

In the upper surface of the block 1 are formed three grooves 50, 16 and 17 (Figs. 10 and 13) that play an important part in the operation of the pulsator and that are closed on the upper side by the plate 14 whereby, at the location of said grooves, the block 1 and the plate 14 cooperate so as to form said grooves into closed ducts.

On the other hand, there are formed on the lower surface of the plate 15 two grooves 18 and 19 (Figs. 9 and 13) that have also a part to play in the operation of the pulsator and are closed at their lower part by the plate 14 so that, at the location of said grooves, the plate 14 cooperates now with the plate 15 so as to form also closed ducts.

The plate 15 serves also through its upper face as a slideway for two slide valves 20 and 21 that assume reciprocating movements in parallel directions forming a right angle with the longitudinal axis of the block 1.

These slide valves 20—21 are constituted by small blocks (Figs. 7A and 7B) having a lower rectangular surface 24 in contact with the ported plate 15 and an upper surface $24^1$ also rectangular but of a smaller size than 24; these slide valves are housed in pusher members 26 (Fig. 7) provided at each end with a lug 27 folded downwardly and provided with a short sleeve 28.

The slide valves 20 and 21 carry on their surface 24 parallel grooves $26^1$ and $26^2$, the groove $26^1$ having a breadth substantially larger than that of the groove $26^2$, and they are held in the corresponding pusher member 26 by small folds 31 formed by the latter and obtained through cutting or stamping and folding over as shown in Fig. 7.

A clearance of about 1 mm. is provided between the pusher member 26 and the corresponding upper surface $24^1$ of the slide valve 20 or 21.

On the other hand, the lateral plates 11 show to either side of their medial axis two recesses 32 (Fig. 2) of circular shape inside the upper part of which are formed openings 33, the lower edge of which is defined by a ridge 34 having a downwardly incurved outline.

The arrangement of the parts as a whole is such that each sleeve 28 of a pusher member lies axially of a recess 32 and may bear against the bottom of the bend formed by the ridge 34 (Fig. 2).

To each lateral plate 11 is secured preferably by means of screws 35 (Figs. 2 and 6) engaging the sleeves 28, a diaphragm 36 covered in its turn by a side cover 37 that is rigid with the plate 11 through the agency of a single screw, not illustrated, or of an equivalent part entering a tapped hole 38 (Fig. 2), in the plate 11, after passing through openings 39 and 40 provided respectively in the diaphragms 36 and the cover 37.

The cheeks or plates 11 are provided at their periphery with a peripheral flange $11^1$ for housing suitably the corresponding diaphragm 36. The covers 37 are provided with recesses 41 located in register with the recesses 32 of the plate 11 and opening into central hollowed parts 42 so as to form, between each diaphragm 36 and the corresponding cover 37 and in register with the recesses 41 and central hollowed parts 42, open spaces or chambers (Fig. 6) that are submitted alternatively to the action of vacuum and atmospheric pressure in order to produce the movement on the pusher members 26 and of the slide valves 20—21 as disclosed hereinafter.

The openings 33 allow the passage and sliding of the ends of the pusher members 26 through the plates 11.

The slide valve 20 located on the side nearer the connections 9 is a milking slide valve through which the air chambers of the milking cups are set alternatively in connection with the supply of air and with vacuum, while the slide valve 21 is a controlling slide valve.

Along the longitudinal axis of the block 1 and inside said block as well as inside the connection 2 is bored a duct 43 that stops short at a small distance from the smaller end of the block 1 to which the plate 4 is rigidly secured.

Inside the block 1 are bored vertically starting from its upper surface:

(1) A central part 44 (Figs. 4 and 10) opening into the duct 43 and also into a chamber 45 (Fig. 4) through which the block 1 fits as known per se on a plug carried by the cover of a milker-pail.

(2) In close proximity with the flange 13 corresponding to that end of the block 1 to which the plate 4 is secured, is provided a vertical channel 46 of rectangular outline, the cross-sectional area of which is comparatively large and that opens into the pipe 43 at the end thereof.

(3) In register with the controlling slide valve 21, a vertical channel 47 of small circular cross-sectional area opens into the pipe 43 on the side lying between the central opening 44 and the small side of the block 1 carrying the connection 2.

Figure 10:
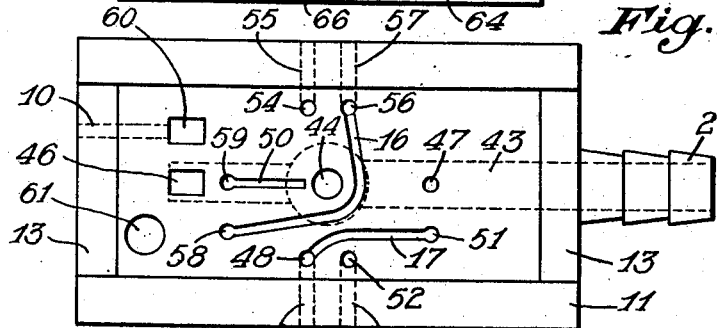
Fig. 10 is a plan view showing the upper surface of the supporting block, the pusher members and pistons being assumed to be removed as well as the device adjusting the number of pulsations.

On the other hand, there open into the upper surface of the block 1 and in proximity with each longitudinal edge the following channels:

I. Along the front edge, that is the edge considered conventionally as such:

(a) A channel 48 (Fig. 10) directed downwardly along a vertical line in the block 1 and extending then horizontally as shown at 49 in Fig. 10 in the latter and in the plate 11 on the front side of the arrangement, said channel opening finally into the recess 41 corresponding to the milking slide valve through a port $49^1$ formed in the diaphragm 46 corresponding thereto and a groove $50^1$ formed radially inside the recess 41 as shown in Fig. 2.

To the channel 48 is connected the end of the groove 17 (Fig. 10) that assumes a bent shape leading to the location of the controlling slide valve and ending in proximity with the front edge considered as a small circular hollow 51 aligned with reference to the vertical channel 47 along a perpendicular to the longitudinal axis of the block 1.

(b) A channel 52 directed at first vertically downwards inside the block and the front plate 11 so as to open into the front recess 42 (corresponding to the controlling slide valve) through a port $53^1$ in the diaphragm 36 and a groove 50 arranged radially in the wall of the corresponding recess 41.

II. Along the rear edge:

(a) A channel 54 directed first vertically downwards inside the block 1 and extending then horizontally at 55 (Fig. 10) inside the latter and inside the rear plate in order to open inside the rear recess 41 corresponding to the milking slide valve.

(b) A channel 56 extending vertically downwards inside the block 1 and then horizontally at 57 (Fig. 10) inside the latter and inside the rear plate 11 so as to open in the rear recess 41 corresponding to the controlling slide valve.

To the channel 56 is connected the groove 16 that after passing round and at a small distance from the central opening 44 between the latter and the outlet of the channel 47 leads towards the location of the milking slide valve and finishes with a small circular recess 58 arranged in alignment in a direction perpendicular to the longitudinal axis of the block 1, with a small recess 59 forming the end of the groove 50 extending over the upper surface of the block 1 in parallelism with the central channel 43 and leading to a point in close vicinity with the central opening 33.

At 60 is provided a port opening into the horizontal channel 10 leading to the connections 9.

Figure 11:
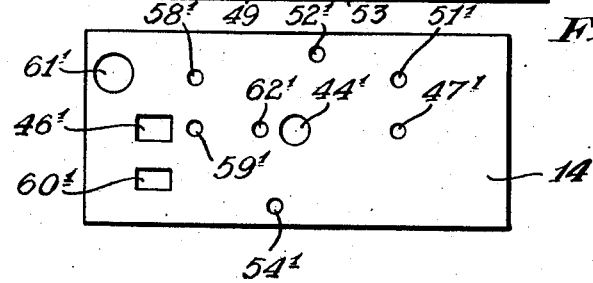
Fig. 11 is a view showing the lower surface of the intermediary plate after turning over through 180° with reference to its operative position.

In the plate 14 are provided as shown in Fig. 11:

(a) Ports $44^1$—$46^1$—$60^1$—$61^1$ corresponding as to shape and location respectively to the opening 44, to the channel 46, to the port 60 and to the port 61 admitting air through the block 1 as shown in Fig. 7C.

(b) Small openings $58^1$—$59^1$—$47^1$—$51^1$—$52^1$—$54^1$ corresponding as to shape and location respectively to the recess 58, to the recess 59, to the channel 47, to the recess 51, to the channel 52 and to the channel 54 in the block 1.

An opening is also provided at $62^1$ at a location registering with the end of the groove 50 in the block 1 nearest the central opening 44.

In the plate 15 are provided as shown in Fig. 9:

(1) Ports $44^2$—$46^2$—$60^2$ and the air admission port $61^2$ corresponding as to shape and location respectively with the ports $44^1$—$46^1$—$60^1$ and with the opening $61^1$ in the plate 14.

(2) Openings $58^2$—$59^2$—$47^2$—$51^2$ and $62^2$ corresponding respectively with the openings $58^1$—$59^1$—$47^1$—$51^1$ and $62^1$ in the plate 14.

Moreover, there are provided at 63 and 64 openings lying respectively in alignment with the openings $58^2$—$59^2$ and $47^2$—$51^2$ in a transversal direction.

On the other hand, the lower surface of the plate 15 shows two grooves 18 and 19.

(a) The groove 18 starts from the opening 63 and leads to a recess 65 located correspondingly with the opening $52^1$ in the plate 14.

(b) The groove 19 starts from the opening 64 and ends at a recess 66 located correspondingly with the opening $54^1$ in the intermediary plate 14.

It will be noticed that the supporting block 1 and the upper removable plate 15 have their grooves arranged horizontally while the main axes of the ports are normal to the horizontal surface carrying said grooves so as to allow an easy production of said ports through the molding of a suitable metal or thermoplastic material.

Furthermore, the plate 15 should have ports the shape and position of which must be suitably defined whereas the corresponding openings in the intermediary plate 14 and in the supporting block may be somewhat wider and less accurately positioned.

Above the central portion of the plate 15 is located an arrangement for adjusting the pulsator including a cylinder 70 to bottom 71 of which carries in the example illustrated in Figs. 4 and 8 a hollow rod 72 engaging the central opening 44 in the block 1, said hollow rod being held fast by a nut 73 engaging the outer threaded end of said rod 72.

In the example illustrated in Figs. 4 and 8, the cylinder bottom 71 shows outwardly and at its periphery a groove 74 the bottom of which is provided with openings 75 while said bottom is covered also on its outer surface by a washer 76 that may be made for instance of rubber and has a single peripheral opening $76^1$ and a central opening $76^2$ through which the rod 72 may pass. After mounting the arrangement, said washer 76 is fitted over the plate 15 in a position such that the opening $76^1$ lies above the opening $62^2$ in the plate 15.

As illustrated in Fig. 12, the cylinder 70 may also be rigid with the plate 15 and the pipe 94 formed in Figs. 4 and 8 by the hollow rod 72 is constituted in this case by a screw $72^1$ provided with a longitudinal bore $94^1$ and screwed inside a tapping of the central opening $44^2$ in the plate 15.

The opening $62^2$ communicates then with a circular groove 77 connected with the inside of the cylinder 70 through peripheral notches $83^2$ of a washer $83^1$.

The cylinder 70 is closed at its upper end by a cover 78 bearing against the upper edge of this cylinder but showing a peripheral tubular projection 79 outwardly threaded so as to be screwed into the upper tapped part of the cylinder 70. This cover carries centrally a needle valve passing through it and including a cylindrical threaded portion 80 followed by a smooth cylindrical part 81 from which is cut on the lathe the terminal portion 82 that is very slightly tapering for the reasons disclosed hereinafter.

Round the needle valve 80—81—82 is provided a sleeve or nozzle member 83 the bore of which has at its upper end a diameter corresponding to that of the smooth part 81 of the needle valve. The lower end of this sleeve 83 finishes with a nozzle forming a mere adjustable opening 85 round the needle valve end 82 and also an empty space $84^1$ surrounding said needle valve and communicating with the inside of the cylinder 70 through two coaxial openings 84.

At its upper end, the sleeve or nozzle member 83 carries a flange 86 through which it engages a recess 87 in the cover 78.

Above the cover 78 is provided a locking nut 88 resting on the upper surface of said cover with the interposition of a washer 89, e. g. of leather.

The rod 81—82 ends at its upper end with a knurled head 90 with which a mark carrying disc 91 is rigid.

The threaded portion 80 of the needle valve is screwed into the cover 78 and nut 88 between which is inserted as stated a washer 89 of leather or the like soft material adapted to prevent any undesired unfastening of the nut 88.

It will be readily understood that through this arrangement the air entering the cylinder through the port $62^2$ may be sucked into the duct 43 through the openings 84, the bore $84^1$, the adjustable port 85, and the bore 94 or $94^1$ in the hollow rod 72 or in the screw $72^1$.

Fig. 12 shows moreover that there may be provided means for air filtering including preferably a double filter constituted by:

1. A first filter that is a felt or cotton wool cylinder 95 through which the stream of air flows from which the dust is to be removed and that serves for holding back the large dust particles.

2. A second filter constituted by a wound strip 96 constituted by fine-mesh canvas, housed between two coaxial removable cylinders 97 and 98 fitted round the sleeve or nozzle member 83 and perforated at 99 in such a manner that the air may be brought under depression through said openings 99 and the strip 96 before reaching the opening 85.

The operation of the pulsator according to the invention is as follows (Fig. 13):

The pulsator is connected with the general suction pipe through a rubber hose fitted over the connection 2.

The depression acting inside the pulsatory arrangement is a constant one because it is adjusted and kept at a predetermined value through the operation of a valve (not illustrated) inserted in the general suction pipe.

This constant depression is apparent in the duct 43, the channels 46—47 and 94 or $94^1$ while there prevails in the hollows 51, the ports 64 and 60, the grooves 17 and 19 leading to the diaphragm chambers 41 at A and B alternatively a depression equal to that in the duct 43 and a pressure equal to atmospheric pressure, according to the position occupied alternatively by the valve 20 at A and B and by the valve 21 at C and D (Figs. 4 and 13).

The letters A—B—C—D define the extreme positions of the pusher members.

The recess 59 (Fig. 13) is submitted to the action of a depression that is purposely reduced through the fact that the air passing through the channel 94 or 94$^1$ passes round the throttling needle valve 82 (Fig. 12) when coming from the filtering chamber in the cylinder 70 and through the port 62, the duct 50 and the recess 59 (Figs. 4 and 13).

Through this recess 59 (Figs. 4 and 13) the reduced depression is applied alternatively through the ports 63 and 58 (Fig. 13) and the channels 18 and 16 (Fig. 13) to the rear side of the diaphragms 36 at C and D.

Similarly the maximum depression that is equal to the prevailing in the channel 43 is exerted alternatively through the ports 64 and 51 (Fig. 13) and the corresponding channels 19 and 17 (Fig. 13) on the rear surface of the diaphragms 36 at A and B.

It is well known that in all pulsators, the association of the action of air at atmospheric pressure and of a partial vacuum produced by the vacuum pump defines the driving power producing the shifting of the movable members of the pulsators such as diaphragms, pusher members and slide valves.

In the present case, the movable members include two pusher members 26 (Figs. 2—4—7 and 13) both of which are connected through their ends with the two lateral diaphragms 36 (Figs. 2—6 and 13).

These two diaphragms form with the two lateral covers 37 four chambers 41 (Fig. 13), that is two chambers per pusher member.

One of these chambers is submitted to depression while at the same time the opposed chamber is submitted to atmospheric pressure. Consequently the pusher member moves in the direction of the resultant of said two actions.

During its displacement, the left hand pusher member 26 carries along with it the slide valves 20 and the right hand pusher member 26 carries along with it the slide valve 21 as shown in Figs. 7A and 13.

Considering (Fig. 13) the left hand slide valve at the end of its stroke at B while the other slide valve 21 has reached the end of its stroke at D, the groove 26$^2$ of the left hand slide valve 20 provides for communication between the recesses 58 and 59 while at the same time the port 63 is uncovered and submitted to the action of atmospheric pressure.

In this position B of the slide valve 20, the action of a partial vacuum is felt in the duct 16 and reaches the outer surface of the diaphragm 36 in the chamber 41 corresponding to C which leads to a shifting of the slide valve 21 towards the end of its stroke at C.

When the slide valve 21 has reached this position, it connects the groove 26$^2$ in its contacting surface the ports 64 and 67 whereby maximum depression is exerted through the pipe 19 on the rear surface of the diaphragm 36 at A in the chamber 41. At the same time, the port 51 is uncovered by 21 so that the atmospheric air enters same and reaches through the pipe 17 the chamber 41 behind the diaphragm 36 at B which leads to a shifting on the slide valve 20 from B to A, which latter position is shown in dotted lines. The operation described begins over again during the whole working of the pulsatory arrangement.

It is apparent from the above that under the simultaneous action of depression and atmospheric pressure, one of the two pusher members, say that on the left hand side, is brought to the end of its stroke at B which produces then the shifting towards the end of its stroke of the other right hand side slide valve towards C which in its turn produces the shifting in the opposite direction, that is towards A, of the first left hand slide valve and so on.

The desired frequency of pulsation or the number of displacements per minute of the slide valves is adjusted by acting through the needle valve 80—81—82 on the suction exerted through a double filter on the air admitted in alternation from the chambers bounded by the diaphragms C or D. Said suction is exerted at C through the pipe 16 up to the recess 58 and thence through the groove 26$^2$ located underneath the slide valve 20 and said suction reaches the recess 59 and the channel 50, the filters and finally the periphery of the adjusting needle valve before the air enters the main pipe 43; on the other hand, when the slide valve 21 has been shifted, the air sucked out of the diaphragm chamber D passes into the channel 18 up to the opening 63 through which it reaches through the same groove 26$^2$ underneath the slide valve 20, the opening 59 and the channel 50 so as to again reach the main pipe 43 through the two filters and the periphery of the adjusting needle valve.

It is therefore the frequency of the movements of the right hand slide valve 21 that is actually adjusted by the action of the threaded needle valve and this slide valve generally termed the controlling slide valve adjusts the frequency of movement of the left hand slide valve 20 or pulsation slide valve.

It will be readily understood by way of consequence that only the air contained alternatively in the diaphragm chambers 41 at C and D may pass through the double filter and round the adjusting needle valve at the moment of the alternating setting of these two chambers under depression.

The considered pulsator has only two diaphragms in all for the four ends of the two pusher members and each diaphragm acts simultaneously in opposite directions on two ends of the pusher members.

At A and B, the diaphragm submitted alternatively to atmospheric pressure and to a maximum depression that is equal to that appearing in the main pipe 43 respond more energetically and more speedily than at C and D where only a reduced depression appears alternatively with atmospheric pressure.

Consequently, there are produced more energetic alternating movements of the pusher member and slide valve located between A and B, that are submitted to the maximum depression, as compared to the less energetic and less speedy action exerted on the slide valve and pusher member located between C and D.

By reason of the energetic reciprocating displacements of the slide valve 20, it is possible to obtain a more efficient massaging of the udders of the cows and in view of the presence of the air ports 46 and 60 (Fig. 13) of wide section, the air circulates freely and with a maximum energy from the chamber located between the teat-cups and the flexible inflations up to the main pipe of the pulsator.

The reduced depression acting on the diaphragms at C and D defines for the pusher member and slide valve 21 (Fig. 13) a less energetic rate of operation and an almost uniform reciprocating movement that synchronizes itself with the reciprocating movement of the pusher member and slide valve 20 located between A and B by reason of each shifting of one slide valve being controlled by the operation of the other slide valve.

The needle valve 82 defines thus the frequency of the movements of the right hand slide valve that controls the movements of the left hand slide valve and defines thus the frequencies of the pulsations of the apparatus.

The frequencies of the pulsations range normally between 40 and 60 per minute. The sole part to be played by the pulsator consists in alternatively submitting to pressure and to atmospheric pressure the chambers located between the teat-cups and the flexible rubber inflations.

In practice, the movements of the slide valve are not performed as smoothly as supposed hereinabove.

This is due in particular to the fact that the outer air fed into the pulsator is always that of the cattle shed and is therefore laden with dust, steam containing sometimes ammoniacal compounds and also carbonic gas; By reason of the four diaphragm chambers, the different pipes and the chambers located between the teat-cups and the rubber flexible inflations are filled at each complete cycle that is forty to fifty times per minute with such soiled and moist air, it will be readily understood that the moving members of the pulsator are submitted to the objectionable action of said soiled air.

To obtain a perfect mechanical efficiency for the moving parts of the pulsator and thereby to assume a regular, permanent and reliable operation, it is necessary to remove the drawbacks inherent to the unavoidable use of more or less soiled air from the cattle-shed for the actuation of the pulsatory arrangement.

To this end, and according to the invention, the following steps should be taken:

(1) The air is submitted to a preliminary filtration before it is admitted into the chamber inside which the slide valves operate and, to this purpose, taking into account the fluid tightness of the cover, there is provided in the support 1 of the arrangement a channel 61 opening on one hand into said chamber and, on the other hand, under the arrangement through its lower surface 95; inside this channel is inserted a removable filtering pad 61$^1$ (Fig. 7C).

According to requirements, there may be provided a plurality of such channels 61 with a preliminary filter or else the cross section of the preliminary filter provided may be increased. This channel or these channels 61 open into the lower surface of the block 1 at one or more locations protected against the dust that may drop on to the pulsator during its operation.

(2) There should be used for the slide valves and the distributing facing or plate 15 a material that is unaffected by air moisture at the temperature of operation as well as by ammoniacal vapors and/or carbonic acid. Moreover, it is necessary that the steam should not condense in cold or wet weather on the slide valves or the cooperating ported surface where it would form with the dust carried by air minute particles of sludge that would detrimentally interfere with the operation of the arrangement and for this reason it is necessary to make use of a material that is a poor conductor of heat.

Heretofore in known pulsatory arrangements, these various parts or at least one of them was of metal, the other one being possibly made of thermoplastic material. According to my invention, on the contrary, the slide valves and cooperating plate are all of a material that is not heat conductive.

(3) Moreover, as the diaphragms are made of natural or synthetic rubber, with or without the insertion of a medial thin sheet of fabric such as silk or the like material, it is necessary to obtain self-lubrication so as to remove the necessity of external lubrication.

The material used for the ported plate and the slide valves should therefore be constituted by self lubricating material so as to avoid the formation between the slide valves and the ported plate of an emulsion of oil, water and dust than can be carried along into the diaphragm chambers where it would damage the diaphragms or into the filters that it might clog.

In order to answer the conditions defined hereinabove, at (2) and (3), it is of advantage to use for instance for one of the cooperating parts a cast phenol base resin and for the other a graphitised phenol base resin or else it is possible to use a graphitised phenol base resin for both members. According to a modification, the slide valves 20 and 21 may be made of thermoplastic material and the ported plate 15 of metal, but in this case there is fitted into or glued to the plate portions over which the slide valves move, two strips 106 (Fig. 12) of a self-lubricating thermoplastic material that is a poor conductor of heat.

(4) Experience has shown that the needle valve that is essential for adjusting the frequency of the pulsations, is the member that has the most serious action on the regularity of operation of the pulsator because the free space between the tip 82 of the needle valve and the opening to be adjusted, that is the bore 94 or 94$^1$, is so small that the minute dust particles that may pass through an ordinary air filter may yet adhere to the tip of the needle valve by reason of the sudden change in direction and the throttling action to which the air is submitted at said point, whereby dust speedily accumulates to an extent such as will reduce the cross-sectional area of the passage, and brake more and more the air from the diaphragm chambers C and D until the depression has no longer any action, whereby the reciprocating movements of the right hand controlling slide valve are slowed down to substantial stoppage which corresponds to a gradual reduction in the number of pulsations and finally complete stoppage of the arrangement. This gradual reduction of the frequency of pulsation has for its result, if care is not taken, that the frequency of massaging of the udders becomes insufficient and leads to a congestion of these parts and consequently to serious physiologic troubles for the milch cows thus mechanically milked.

To remove completely this serious defect of the pulsator, there is provided a specially designed filter adapted to retain dust particles of microscopic size that may enter the chamber located above the slide valve in spite of the presence of the preliminary filter pad at 61$^1$ and also the dust from the chamber lying between the metal teat cup and the flexible inflation.

This filter includes a small perforated tube 98 round which a ribbon 96 of closely woven fabric is wound about thirty times to form thus a circular filter through which the most minute particles of dust cannot pass. This wound ribbon is protected outwardly by a second perforated cylindrical tube 97 and this forms a small compact system that is fitted inside the cylinder 70.

The two metal cylinders 97 and 98 and the wound ribbon 96 rest through their lower end on the rubber washer 83¹ that in addition to the part played as a packing compensates for the small possible difference in height between the two metal cylinders 97 and 98 and the member 83 forming at its lower end a nozzle round the needle valve.

The air from the diaphragm chambers C and D, before it passes over the last filtering ribbon 96 (Fig. 12), has passed through a filtering sleeve of cotton wool or felt 95 (Fig. 12).

If, after several months of operation, the last filtering ribbon is clogged or if for any other unforeseen reason, the result is reached, the pulsator would assume a lesser number of pulsations per minute and the operator might without any difficulty provide for the replacement of the filtering ribbon.

It is also possible for an operator to inadvertently remove the filtering ribbon or to forget its replacement inside the arrangement after dismantling of the latter or else it may happen that the operator has no spare filter available. In such a case, the tip of the needle valve would become laden with minute dust particles leading to a reduction in the number of pulsations.

To prevent this anomalous operation:

(5) The needle valve system may be removed as a whole without any modification in the adjustment of the pulsatory arrangement so as to allow the operator to return it into its original condition after rubbing between his fingers the soiled tip of the needle valve, which may be done in less than half a minute.

To this purpose, it is sufficient to unscrew the nut 78 without touching the knurled knob 90, to remove the system including the parts 90—91—92—88—89 and 78, to clean with the fingers the tip of the needle valve 82 and then to screw home the nut 78 (Fig. 12) carrying said system of parts 90—91—92—88—89 and 78.

A considerable advantage of the pulsatory arrangement according to the invention consists therefore in that the dismantling may be performed without any modification in its adjustment.

With the known prior arrangements, the adjustment of the number of pulsations to be executed after using the arrangement a few hours is a tedious business for the operator who is generally a farm servant possessing no suitable means for measuring time, chiefly when this adjustment is to be performed in the cattle-shed at milking time. Thus nowadays the adjustments performed at the farm are uncertain and are limited to a rough adjustment of the number of pulsations which is detrimental for the proper operation of the mechanical milking. With the means disclosed above and whatever may happen to the filtering ribbon, it is possible to immediately replace it or do away with it even during the milking without it being necessary to resort to a further adjustment of the desired number of pulsations per minute.

(6) The tip 82 of the threaded needle valve is given an extremely reduced tapering in order to obtain a slight modification in the free cross-sectional area of the bore 85 for a comparatively important vertical displacement of the needle valve 80 and thereby an increased extent of the adjusting sector of the plate 91. As illustrated in Fig. 12, the needle valve 80 including a knurled head 90 has its end slightly tapering in a manner such that the angle at the base of the cone may measure between 89° and 89° 30′. This terminal portion of the needle valve is shifted vertically, by screwing or unscrewing, inside the cylindrical opening 85 (Fig. 12) so that it is possible to reduce or increase micrometrically the cross-sectional area allowed for the passage of filtered air from the diaphragm chambers C and D. Thus, when screwing down the needle valves 80 through actuation of the head 90, the throughput of air passing through the opening 85 is gradually restricted whereas, when unscrewing the knurled head of the needle valve 80, the free passage allowed increases so as to provide an increase of the throughput of air sucked in and consequently of the number of pulsations.

By reason of the very small conicity of the needle valve, it is necessary to rotate it through a large angle to obtain a substantial modification in the cross-sectional area left free between the periphery of the opening 85 and the needle valve 82. Consequently the accurate adjustment of the number of pulsations becomes a very easy matter.

This arrangement allows moreover engraving marks on the upper surface of the disc 91 (Fig. 12), that are brought readily in front of a stationary mark carried by the ring 92 that is fitted inside the nut 78 through the agency of the stud 93, said mark giving out the normal minimum and maximum frequencies of pulsation to be adopted by the operator of the mechanical milking machine.

Between the minimum and maximum frequencies that are provided the operator may choose instantaneously the frequency that is the best adapted to the cow that is being milked.

The parts 80—88—89 and 78 in Fig. 12 form a rigid system wherein it is possible however to execute a shifting of needle valve 80 through action on the knurled head 90, the rotation of which requires a certain effort as required for preventing any fortuitous undesired shifting of the needle valve. The nozzle member 83 surrounded by the ribbon filter described hereinabove is fitted freely inside the opening provided to this purpose in the part 78 after the latter is screwed into the cylinder 70 that may be in one with the ported plate 15.

The cover 78 is locked by screwing against the upper edge of the cylinder 70 and as, on the other hand, the nozzle member 83 bears completely inside the recess provided in said cover member 78, the position of the opening 85 remains unvarying with reference to the terminal portion of the needle valve when the system considered is fitted again in position.

At 105, the shank of the needle valve carries a small plate whereby, if the operator omitted inadvertently reinserting the ribbon filter and the sucked in air were laden with dust, most of the dust particles would form a deposit at 84¹ over the small plate 105 at the point where the air is constrained to assume a sudden change in direction. This latter feature of the needle valve does not prevent the gradual clogging of the opening 85 but at least it delays it for a very long time. The cap 92 that is fitted for instance as stated by means of a stud 93 in the upper portion of the cover member 78 and the upper level of which is substantially flush with the lower level of the disc 91 carries marks corresponding to the range of normal frequencies in which the operator chooses that which is the most suitable. The cap 92 prevents also any fortuitous contact with the nut 88 when operating the knob 90 so as to prevent any undesired release. From the above, it is easy to ascertain that the opening 85 remains free permanently by reason of the filters of a special type already disclosed, and the possibility of wiping the tip of the needle-valve and reinserting it without any modification in the adjustment to predetermined number of pulsations.

All the pulsators now on the market require very frequent readjustment by reason of the gradual closing in of the needle valve opening and of the impossibility of cleaning the latter without it being necessary to again adjust the frequency of pulsation.

The cover 12 of the chamber 101 of the pulsator into which the air enters after a preliminary filtering in the opening 81 may provide for fluid-tightness of said chamber 101 through the agency of a plate 102 of rubber or the like yielding material. This plate may also be made of felt in which case it acts as a preliminary filter. This yielding plate 102 forms a packing that is held against the cover of the arrangement by an inner metal sheet 103 bent to match the shape of the cover 12. When the plate 102 is made of rubber, the cover 12 is completely fluidtight. When it is made of felt, the fluidtightness is no longer ensured but the air entering thus the chamber in addition to or possibly instead of the air entering through the channel or channels 81, can only be air that has been previously filtered and enters through the whole periphery of the cover.

As illustrated in Fig. 2A, the rubber plate 102 may rest on the inner flanges 102' formed by the plates 11 and it is enclosed by the cover 12.

The use of diaphragms allows obtaining the advantage, that is well known per se, of avoiding any use of a lubricant as would be necessary in the case of piston operation.

However, in all known arrangements of the same type, each piston has been replaced by one diaphragm whereas in the case of the present invention the four pistons have been replaced by two double diaphragms, which means an advantageous simplification.

To form such diaphragms, thin sheets of rubber are generally used but according to the invention, it is of advantage to use a rubber sheet containing in its medial plane a thin sheet of fabric, preferably silk, so that the diaphragm may retain its yieldingness while its elasticity is reduced in order to prevent any deformation during operation.

The brittleness of thin yielding rubber diaphragms appears after a certain time of working and leads to damages that cannot be foreseen and that appear or are found out unfortunately only during the operation of the pulsatory arrangement, that is when milking in the cattle-shed or in the fields.

Obviously, the operator should then, during the milking, replace as speedily as possible the diaphragm or diaphragms that are no longer operative.

The finding out of the faulty diaphragm with a view to replacing it requires often the dismantling of the four diaphragms equipping the major part of usual pulsatory arrangements.

This finding out of the faulty diaphragm implies the removal of number of screws and when the diaphragm is replaced by a new one, it is necessary to again set in position and screw home the same number of screws, which may be as high as three or four screws per diaphragm.

This loss of time during the milking is considered by the operator as the greatest drawback of diaphragm pulsatory arrangement.

To reduce this drawback and to prevent any objectionable consequence thereof, I have adopted in the case of the invention the two double diaphragms, that is each of the two diaphragms carries two pusher members and is sealed tightly by a cover held by a single screw so that it is required to remove at the maximum two screws before finding the defective diaphragm. The latter is moreover very easily replaced.

From a constructional standpoint, it should be mentioned as a further advantage the fact that the slide valves 20 and 21 are independent of the pusher members and that a clearance is always left between the upper surface of a slide valve and the corresponding pusher member whereby the proper bearing of the slide valve on the ported plate 15 does not depend on the proper positioning of the pusher members or on the possible deformation of the diaphragms that are generally thin and carry the heads of the pusher members, the position of which depends on the other hand on the diaphragms.

What I claim is:

1. A pulsator of the flexible diaphragm type having an air outlet at one end adapted to connect to means for producing sub-atmospheric pressure and having at the other end an air inlet adapted to connect to means for utilization of said sub-atmospheric pressure, including a horizontally disposed block provided with laterally disposed flanges, a plurality of flexible diaphragms carried by said flanges, and a first cover of which the longitudinal edges make contact with the peripheries of said flanges so as to enclose a space between said block, said first cover and the portions of said flanges which extend beyond said block, a pulsation frequency determining and adjusting element located within said space and having manually controllable adjusting portions thereof, projecting exteriorly of said space, said block carrying two slide valves each capable of reciprocating movement in directions parallel to one another and transversely to the length of said block, under the influence of variations in air pressure, one of said slide valves acting as a control member whilst the other valve acts to connect said air inlet alternately to said outlet and to atmospheric pressure, said block being provided with channels for the passage therethrough of air in alternative directions, said flanges having therein depressions for the deflection therein of said flexible diaphragms and means for carrying said diaphragms, pusher members affixed to said diaphragms and each mounting therein a slide valve, said flanges being provided with openings for the reciprocatory movement therein of said pusher elements, and each flange carrying thereupon a respective side cover, each of said covers being provided with twin hollow chambers, respectively positioned opposite said flange depressions, whereby are formed four diaphragm chambers, with which the respective diaphragms cooperate.

2. A pulsator according to claim 1, in which said channels in said block are provided with ports cooperating therewith, and in which there are provided two removable plate members horizontally disposed and lying in superposed relationship upon said block, the upper plate serving to support said slide valves and being provided on its lower surface with channels and being provided with apertures so located as to register with the corresponding said ports in the supporting block, the intermediary plate being provided with ports only, and the superposition on the supporting block of the removable plates allowing the transformation effectively into ducts of the channels formed on the upper horizontal surfaces of the supporting block and on the lower horizontal surface of the upper removable plate.

3. A pulsator according to claim 2, in which said slide valves are movable independently of said pusher members, and including means for mounting said pusher members so that a clearance is left between the upper surface of a slide valve and the corresponding surface of a pusher member, whereby to improve the bearing of said slide valves upon the upper ported plate.

4. A pulsator according to claim 3, in which the slide valves are constructed of self-lubricating thermoplastic material, whilst the ported plate is constructed of metal, and has attached to a portion of the surface thereof relatively small plates of self-lubricating thermoplastic material, having relatively low thermal conductivity, said plates being located upon said metal plate at the positions where said slide valves move, whereby sliding takes place over said smaller plates.

5. A pulsator according to claim 4, in which the device used for adjusting the frequency of the pulsations includes a cylinder rigid with the upper removable ported plate and means placing the inside of said cylinder in communication with said air outlet, said cylinder being alternately put into communication with one of the diaphragm chambers of the controlling slide valve and including a cover for this cylinder and a threaded stem the end of which forms a needle valve, said stem being screwed into said cover.

6. A pulsator according to claim 5, in which the extremity of the needle valve is slightly tapered and including means for moving said needle valve vertically, said means including an outer knob situated at the extremity of said threaded stem of said needle valve.

7. A pulsator according to claim 6 in which, above the cover of the cylinder forming part of said adjusting device, the threaded stem of the needle valve is provided with a lock nut, thereby forming a unit which substantially comprises said cover, the lock nut, the threaded stem, and the knob of said stem, there being also provided a disc carrying indicia and located at the upper part of the threaded stem.

8. A pulsator according to claim 7, in which the adjusting device includes removable means to filter the air coming from the diaphragm chambers.

9. A pulsator according to claim 8, in which the adjustment device is provided with a second removable air filter, including a perforated tube, a closely woven canvas ribbon, wound over said tube, a second perforated tube fitted over said wound canvas ribbon, and a central sleeve-member, provided with a nozzle at its lower part, around which said filters are positioned.

10. A pulsator according to claim 9, which includes a washer under the lock nut on the stem, whereby to prevent any untimely release of said lock nut, said washer being clamped between said nut and the cover, so as to exert a braking action on said cover, the relative positions of said members being modified only when the cover is unscrewed from the cylinder and when the cover is replaced thereon.

11. A pulsator according to claim 10, in which the nozzle is provided with a removable sleeve, the cover has a recess and said sleeve engages said recess of the cover in such manner that the dismantling and mounting of the cover are without influence upon the position of the needle valve in the nozzle.

12. A pulsator according to claim 11, in which is provided a ring fixed into the cover of the cylinder, forming part of the adjustment device, and having an indicium, and in which a disc is carried by the upper end of the threaded stem and is provided with two indicia indicating, respectively, the normal minimum and maximum frequencies of pulsation.

13. A pulsator according to claim 12, in which is provided upon the shank of the needle valve a small plate, for retaining most of the dust particles, if the pulsator is operated without being provided with the filtering means of the adjustment device.

14. A pulsator according to claim 13, in which there is provided below the sleeve member a compressible washer, which, when compressed, causes said sleeve member to be held applied against the bottom of said recess formed in the cover, whereby this washer, while forming a tight closure at the base of the two filters, compensates for the differences in height which may take place, during manufacture, between the perforated cylinders by which one of the filters is surrounded and the upper flange of the sleeve-member forming the nozzle.

FERNAND JEAN JOSEPH
JULIEN HENRARD.

References Cited in the file of this patent

UNITED STATES PATENTS

| Number | Name | Date |
|---|---|---|
| 1,844,853 | Hodsdon | Feb. 9, 1932 |
| 1,875,083 | McCornack | Aug. 30, 1932 |
| 2,017,754 | Hodsdon | Oct. 15, 1935 |
| 2,129,765 | Hodsdon | Sept. 13, 1938 |
| 2,464,917 | Babson | Mar. 22, 1949 |